United States Patent [19]

Damlamian

[11] 3,879,117

[45] Apr. 22, 1975

[54] APPARATUS FOR THE VISUAL DISPLAY OF INSCRIPTIONS ON TRANSPARENCIES

[76] Inventor: Jean J. Damlamian, 4, Rue Lazare Carnot, 92140 Clamart, France

[22] Filed: Oct. 2, 1973

[21] Appl. No.: 402,828

[30] Foreign Application Priority Data

Oct. 4, 1972 France .............................. 72.35164

[52] U.S. Cl. .................................................. 353/19

[51] Int. Cl. .......................................... G03b 31/06

[58] Field of Search ........... 353/25, 26, 27, 19, 122, 353/103–117

[56] References Cited

UNITED STATES PATENTS

| | | | |
|---|---|---|---|
| 3,704,451 | 11/1972 | Pearson | 353/25 |
| 3,824,008 | 7/1974 | Smith | 353/26 |

FOREIGN PATENTS OR APPLICATIONS

| | | | |
|---|---|---|---|
| 207,228 | 3/1957 | Australia | 353/65 |

*Primary Examiner*—Richard E. Aegerter
*Assistant Examiner*—A. J. Mirabit
*Attorney, Agent, or Firm*—Abraham A. Saffitz

[57] ABSTRACT

Device for projecting transparencies which bear sections of magnetic tapes having recorded thereon binary digital words representative of alphanumerical characters. During projection, the binary words are converted into visual characters by a "digital-image" converter. The device can sort transparencies by comparing the digital words recorded thereon to given sorting words. The rate of the electronic part of the device is synchronized with the velocity of the movement of the transparencies when they travel from their feed position to their projection position.

6 Claims, 8 Drawing Figures

PATENTED APR 22 1975 3,879,117

SHEET 1 OF 5

APPARATUS FOR THE VISUAL DISPLAY OF INSCRIPTIONS ON TRANSPARENCIES

The present invention relates to an apparatus for the visual display of magnetically recorded inscriptions and is suitable for reading an inscription on recorded section of magnetic track incorporated in the frame or mounting of a transparency.

Transparency projectors embodying audio magnetic recorders are known in the prior art. They are designed for projecting transparencies including sections of a magnetic tape and include a movable magnetic head for scanning the tape sections when the transparency stands motionless in its projection location.

The object of the invention is to provide a transparency projector combined with a digital magnetic recorder and adapted to project transparencies carrying magnetic tape sections having recorded thereon binary digital data and to convert these digital data into alphanumerical characters appearing on a visual display panel.

Another object of the invention is to provide a transparency projector and reading-back device making it possible to sort transparencies as a function of alphanumerical characters recorded on their magnetic tapes.

The projector and digital magnetic recorder of the invention renders it possible to have inscriptions or commentaries magnetically recorded on the frame or mount of transparencies in binary digital form, to project the transparencies conventionally and, at the same time, to visually display these inscriptions and commentaries in alphanumerical form.

The invention will now be described in more detail, by way of example only, with reference to the accompanying drawings, in which.

Figures 1, 3:
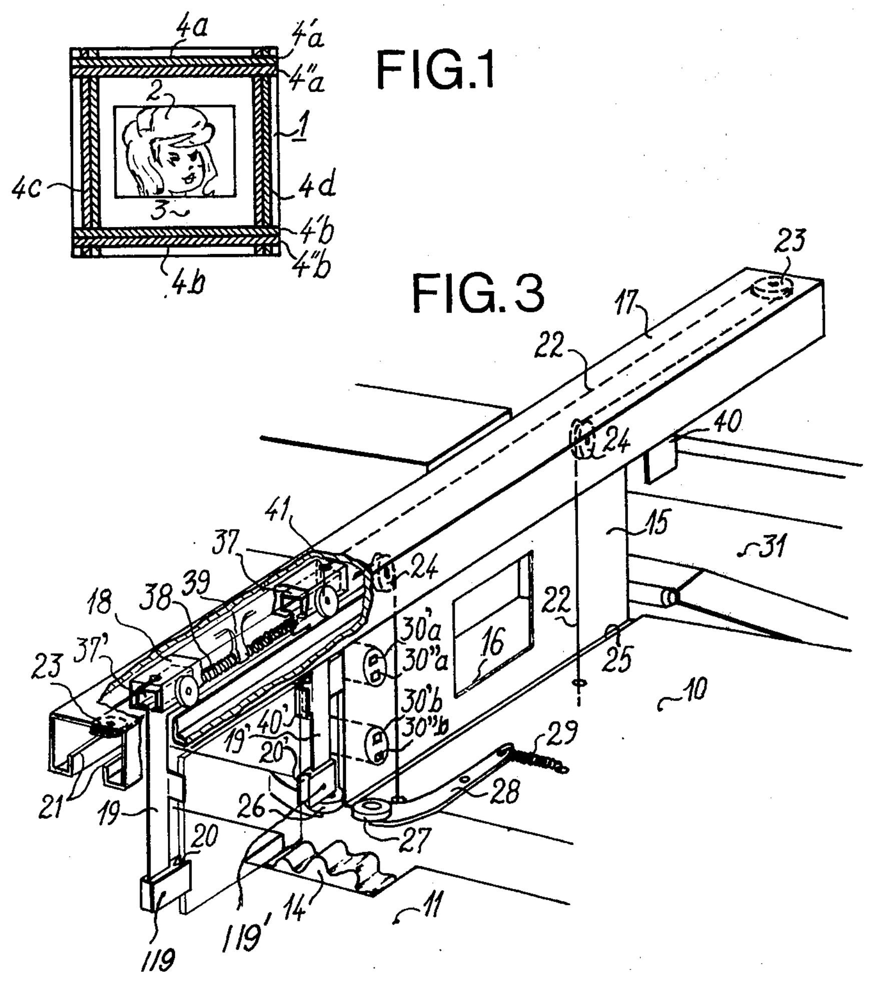
FIG. 1 shows a transparency incorporating a magnetic tape.
FIGS. 2, 3 and 4 illustrate the mechanical part of an automatic projection, recording, scanning and sorting apparatus.

In FIG. 1, a conventional transparency 1 comprises a transparent central portion of rectangular shape 2 bearing an image which is to be projected, measuring approximately 34 × 23 mm, and a square peripheral portion 3 of cardboard or analogous product forming the frame or mount of the transparency and measuring 51 × 51 mm.

Four strips of magnetic tape 4*a*, 4*b*, 4*c*, 4*d*, each having a length of approximately 4.5 cm, are fixed on the front side of the transparency 1. The width of the tap amounts to approximately 3 mm; each strip contains two tracks, for example 4'*a*, 4'*b* and 40''*a*, 4''*b*, and alphanumerical characters may be recorded in the form of a six-bit code. It is assumed that the density of the bits on the tape amounts to 60 bits per centimetre, which rendres it possible to record approximately 45 alphanumerical characters on each strip.

The numerical code preferably applied is the so-called non zero-return inversion code (NRZI). This is a code in which each bit takes up the whole of the period of recurrence of the bits and in which a magnetic induction change corresponds to the bit "one" and a constant induction corresponds to the bit "zero." This convention is used on one track whereas the reverse convention is used on the other track. This code being an NRZ code, thus has the benefit of the well known advantage over the RZ code of requiring a smaller bandwidth for the same bit rate and also being an inversion code, it is easily decoded since it is sufficient to rectify, amplify and clip the signal read back. The code being used complementarily is self-checking; finally it allows a definite degree of variation in the tape speed. The complementary NRZI code, sometimes referred to under the heading of complementary NRZM code, has been descrived for example in the following works "Structure et technologie des ordinateurs" by A. Profit, publishers Armand Colin 1970, page 300, and "Digital Magnetic Recording" by A. S. Hoagland, John Wiley & Sons publishers, 1963, page 126.

Since the scanning of the magnetic tapes occurs at the instant of insertion of the transparency into the projector, only the tapes parallel to the horizontal sides of the transparency are recorded. In the following, it will be assumed that the data recorded on the two upper and lower parallel tapes are consecutive and are stored in registers at adjacent locations in a memory storage unit.

Figure 4:
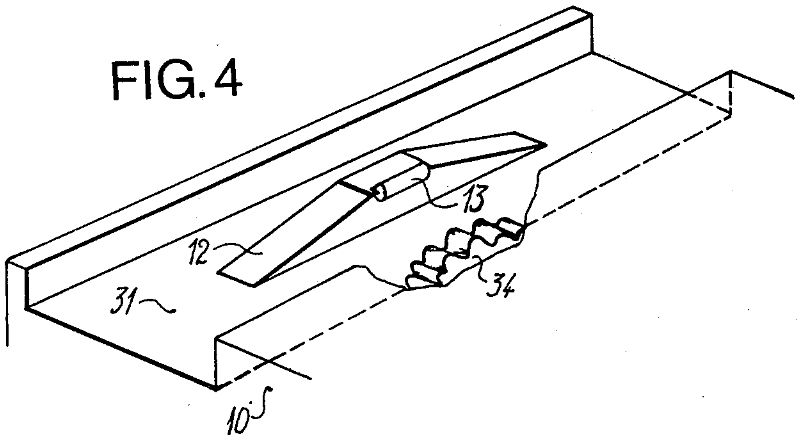
Figure 2:
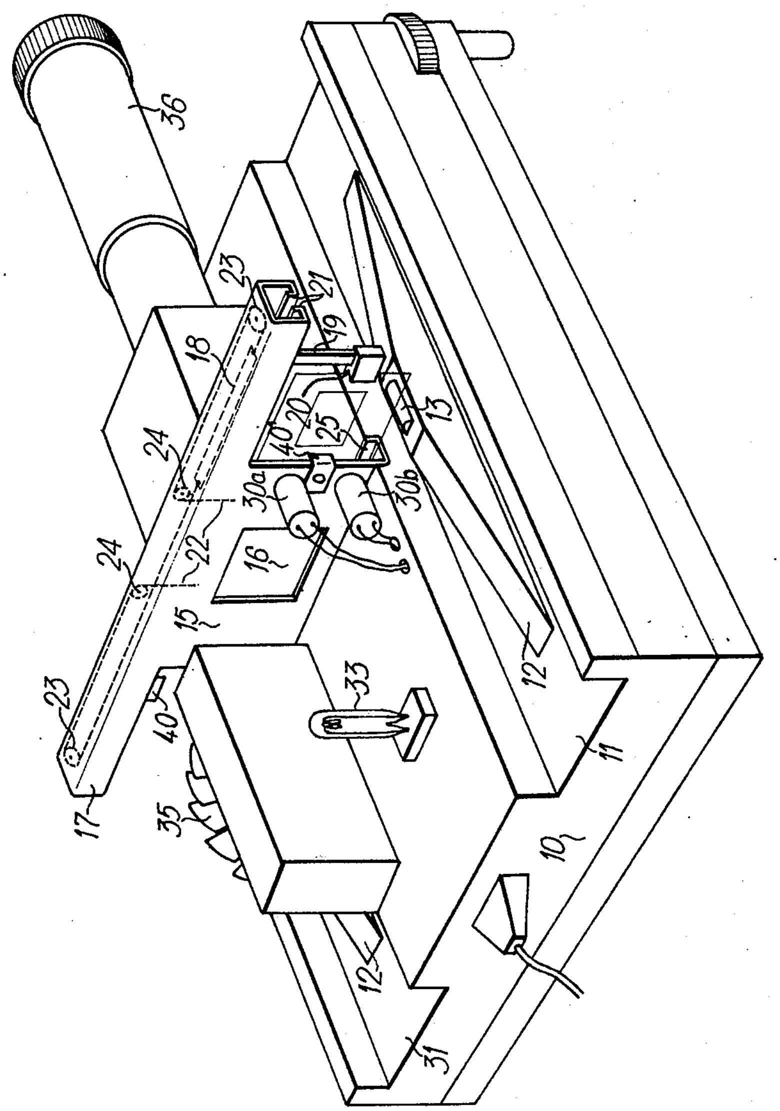

Referring to FIGS. 2, 3, 4, a feed device of the transparency projector reader, and the ejection and sorting device are shown in detail. The apparatus is a conventional apparatus, except for transparency reading-out, ejection and sorting.

It comprises a base 10 on which are mounted two slides 11 and 31 parallel to the direction of projection and forming tracks for two transparency holders or baskets (not shown) one being a feed holder and the other being a receiving holder. On each of these slides is arranged a double-sided ramp 12 for raising the transparencies to the pickup or replacement station. A roller 13 bears the lower edge of the transparency during the displacements occuring during picking up and replacing in position. Pinions 14 and 34 mesh with corresponding racks on the underside of the holders for causing the feed holder to move forward step by step and positioning the receiving holder as a function of the results of the sorting operation.

A panel 15 pierced by a projection aperture 16 is arranged transversely with respect to the apparatus. The upper portion of the panel 15 forms a cross-beam or bridge 17 extending throughout the width of the apparatus and overhanging the slides 11 and 31 and the holders they guide. The cross-beam acts as a rolling track for a conveying unit 18 which laterally comprises two vertical arms 19 and 19'. The unit 18 has the shape of an inverted U-shaped bar. The arms 19 and 19' are not fastened direct to the bar 18 but are secured to two stirrups 37 and 37' sliding within the bar 18, these two stirrups being biased towards each other by a spring 38, which is itself secured at its middle to a peg 39 of this bar. The arms 19 and 19' serve the purpose of conveying the transparencies throughout the length of the cross-beam, of grasping them upon being picked up from the feed holder in order to the placed in position for projection, and of releasing them upon being replaced in position in the receiving holder.

Arms 19 and 19' carry at their ends grippers 119 and 119' with their inner edges cut as a reentrant dihedron 20, 20′ to hold the transparencies precisely vertical during conveying and projection. During the displacement of the unit, the branches 19 and 19′ grip the transparency between owing to the action of the spring 38. When the converyor unit 18 reaches its end of travel positions, that is to say in register with the slides 11 and 31, one of the arms 19 or 19′ comes into contact with a stop 40 and 40′. This arm is then stopped and the spacing between the arms is increased to allow the grasping or releasing action. To grasp a transparency it is lifted out of the feed holder by the ramp 12 and inserted endways between the arms 19 and 19′ whereof the spacing is such that they allow the transparency to pass between the notches 20, 20′ of the dihedrons. When the unit 18 leaves its initial position, the branch 19′ leaves its stop 40′, the gap 19—19′ decreases and the grippers grip the transparency which is thus held by the conveyor unit 18. When the conveyor unit 18 reaches its final position, which is plumb with slide 11 or slide 31, the branch 19 abuts against its stop 40 or the branch 19′ abuts against its stop 40′, the gap 19—19′ increases and the grippers release the transparency.

The functions of the feed and receiving holders are interchangeable; nevertheless, as will be seen, the feed holder is driven step by step systematically, whereas the receiving holder undergoes a series of step by step translatory displacements, but subject to certain conditions.

The conveyor unit 18 comprises four wheels 41 which roll on rails 21 and it is driven by a cable 22 which runs back at the end of travel positions over pulleys 23 installed at the extremities of the cross-beam 17 and over pulleys 24 for vertical deflection towards the control device situated in the base 10.

On the base and in register with the cross-beam is situated a narrow slide 25 having a width little greater than the thickness of a transparency. Along this slide are arranged pairs of rollers whereof only one 26–27 is apparent from FIG. 3. The roller 26 has its spindle stationary and the roller 27 is arranged on the extremity of a lever 28 drawn by a spring 29. The dihedron 20 and the rollers 26–27 allow for the precise guiding of the transparencies in such manner that the magnetic strips they carry have a constant spacing from reading and recording heads 30′a and 30″a, and 30′b and 30″b.

The reading and recording heads 30′a and 30″a, and 30′b and 30″b, which are intended to scan the corresponding tracks 4′a and 4″a and 4′b and 4″b, are secured to the panel 15 one below the other and at levels corresponding to the location of the tracks on the transparency.

The remainder of the projector-reader apparatus is of conventional nature. A projection bulk 33, the fan 35 and the objective 36, are shown. The optical assembly of the collimator has been removed to provide a view of the panel and of the projection aperture.

Figure 5:
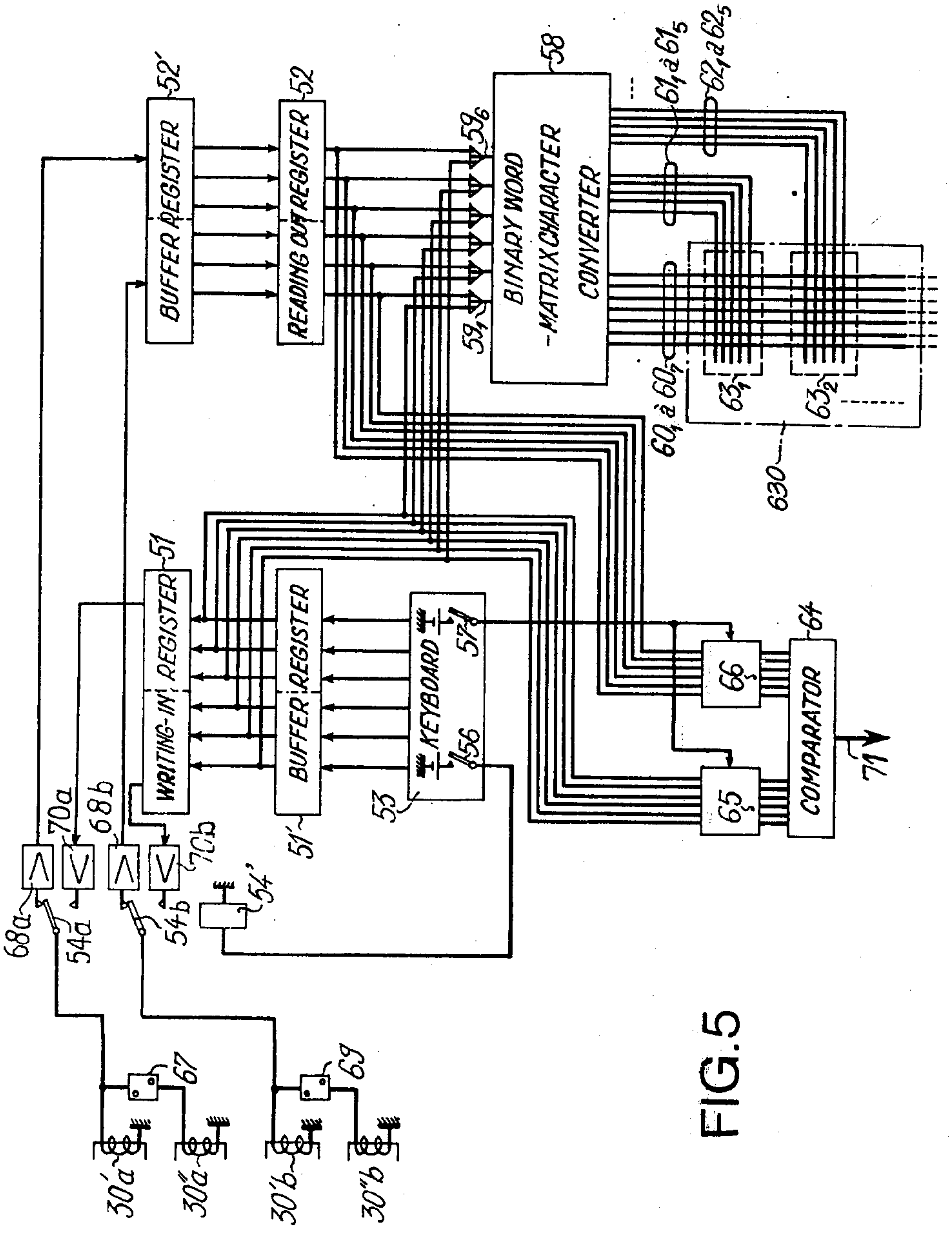
FIG. 5 illustrates the electronic part of the apparatus.

FIG. 5 shows the electronic circuits of the apparatus. To explain these circuits, it is appropriate to point out that the scanning of the tracks is performed between the picking up and projection of the transparencies, whereas recording occurs between projection and release.

The reference numerals 51 and 52 respectively refer to a writing-in shift register receiving the coded characters from a keyboard 53 through a buffer register 51′ and a reading-out shift register receiving the coded characters from one of the pairs of heads 30′a–30″a and 30′a–30″b through a buffer register 52′. The shift registers 51 and 52 are used as parallel-series and series-parallel converters. The registers 51, 51′ and 52, 52′ comprise two memory spaces of identical size, these two spaces corresponding respectively to the data recorded on the upper magnetic tape and to the data recorded on the lower magnetic tape. Writing-in or reading-out of the two tapes occur simultaneously owing to the two sets of heads 30′a, 30″a and 30′b, 30″b. The parallel input terminals of the writing-in register 51 are connected to the output terminals of the buffer register 51′ and the parallel output terminals of the buffer register 52′ are connected to the input terminals of the reading-out register 52.

The keyboard 53, for example a teleprinter keyboard, is connected in parallel to the buffer register 51′ and controls the insertion into this register of the codes of the alphanumerical characters whereof the keys have been depressed. A "record-playback" key 56 controls the relay 54′ of the contactors 54a and 54b.

The heads 30′a and 30″a which write-in or read-back the corresponding tracks 4′a and 4″a are connected, directly in the case of the first and through an inverter 67 in the case of the second, and both through the contactor 54a, to the input side of a read-back amplifier 68a. The output side of ths amplifier is connected to one of the series input terminals of the buffer register 52′.

Similarly the heads 30′b and 30″b which write-in or read-back the corresponding tracks 4′b and 4″b are connected direct in the case of the first and through an invertor 69 in the case of the second, to a read-back amplifier 68b, through the contactor 54b.

The series output terminals of the writing-in register 51 are connected to the input terminals of the writing-in amplifiers 70a and 70b. The output terminals of these amplifiers are connected to the corresponding pairs of heads 30′a, 30″a and 30′b, and 30″b.

Write-in and read-back amplifiers for NRZI code are known in the prior art and are described, for example, in the work "Magnetic Recording in Science and Industry," published by C. B. Pear Jr., New York, page 155, FIG. 5.9, in respect of write-in amplifiers and FIG. 5.10 in respect of read-back amplifiers.

The parallel output terminals of the buffer registers 51′ and 52′ are connected to a code converter 58 converting the six-bit binary words into standard matrix characters of seven lines and five columns. As shown, these matrix characters are represented by five words of seven bits or seven words of five bits. Such code converters are known in technology under the name of read only memory units or ROM. They distribute five words, each having seven bits, upon receiving a word having a predetermined number of bits, as an address. A converter of this type is described, for example, in the review "There's a better way to design a character generator" by Gene CARTER and Dale MRAZEK which appeared in the periodical "Electronics" of the Apr. 17, 1970, pages 107–112.

A six-bit address word reaches the converter 58 on the input wires $59_1$ to $59_6$. A first set of seven wires $60_1$ to $60_7$ and so many sets of five wires $61_1$ to $61_5$, $62_1$ to $62_5$, . . . as there are alphanumerical characters to be displayed visually leave the converter. The characters $63_1$, $63_2$, $63_3$, . . . are, for example, liquid crystal characters of a liquid crystal display panel 630. Visual display panels employing liquid crystals are described in the review "Liquid Crystal Display Devices" by George H. HEILMEIER, which appeared in the U.S. periodical "Scientific American" in April 1972, pages 100–106. The liquid crystals are of the memory type as described on page 103 of this review. The liquid crystalline material changes to a milky white at the points at which it is exposed to a continuous field and retains this state when the field is cancelled. The substance rapidly becomes transparent again if an alternating field of adequate amplitude and of a frequency of the order of 4 kc/s is applied.

When the converter 58 receives a six-bit address word, it thereupon transmits five words of seven bits on the wires $\mathbf{60}_1$ to $\mathbf{60}_7$ and during the transmission of the first word, it raises the wire $\mathbf{61}_1$ only to a predetermined potential, and then during the transmission of the second, it raises the wire $\mathbf{61}_2$ only to this same potential and so on in sequence.

When all the characters of the board have been activated, a signal generated by a contact controlled by the lever 28 is applied to the converter 58 which then feeds an alternating erasure current through the wires $\mathbf{60}_1$ to $\mathbf{60}_7$.

The parallel output terminals of the registers 51' and 52 are also connected to the two input terminal groups of a comparator 64.

Figure 6:
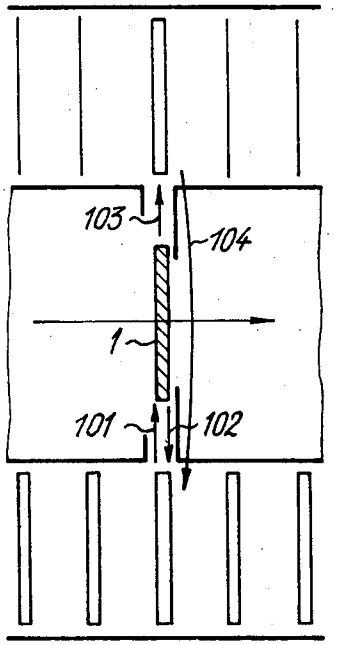
FIG. 6 is a diagrammatical view explaining the operation of the apparatus as a transparency sorter.

The access to these input terminals if controlled by sets of gates 65 and 66 by means of a "normal-setting" key 57 of the keyboard. This comparator can thus receive whilst in the "sorting" state, a series of sorting index characters from the keyboard through the buffer register 51' as well as consecutively characters recorded on the tracks **4'*a*, 4''*a* and 4'*b*, 4''*b* of the magnetic strips 4*a* and 4*b* of the transparencies, read-back by the heads 30'*a*, 30''*a* and 30'*b*, 30''*b* and recorded in the reading-out register 52. The comparator 64 thus performs a scanning operation on the contents of the buffer register 51' and of the read-back register 52, and consecutively compares the characters occupying analogous positions in the two registers. A particular character, referred to as "Joker," may be employed on the keyboard and may be displayed in the buffer register 51'. This joker character entered into the buffer register 51' is considered by the comparator 64 as being identical to any character of the code occupying an analogous position in the read-back register 52. Thanks to these joker characters positioned before and-or after the series of index characters in the buffer register 51', the comparison actually occurs on no more than a part of the characters recorded on the magnetic strips and contained in the read-back register 52. The comparing operation continues until a divergency is detected between the characters occupying an identical position in the two registers. If there is complete identification between the contents of the two registers, that is to say of the comparing operation has been successful, the comparator 64 then transmits a signal at its output terminal 71. This signal has the function of changing the projection movement, comprising an inward displacement of the transparency from the feed position to the projection position, a return of the transparency from the projection position to the feed position and an advance by one step of the feed holder, into a sorting movement comprising an inward displacement of the transparency from the feed position to the projection position, an outward displacement from the projection position to the sorting position, a return of the empty pusher unit from the sorting position to the feed position and an advance by one step of the input holder and of the receiving holder which are time-shifted with respect to each other. These displacements are illustrated in FIG. 6, wherein the arrows 101 and 102 illustrate the projection displacement of the transparency 1 and the arrows 101, 102 and 103 illustrate the sorting displacement, taking into account that the return illustrated by the arrow 104 is traversed by the empty conveyor unit. In the writing-in mode, the transparencies perform the displacement denoted by the arrow 101 in FIG. 6. The operator, by means of the keyboard, sets up the data he wishes to enter into the writing-in register 51 through the buffer register 51'. The data are then recorded on the magnetic tracks in reverse order, during the return displacement of the transparency illustrated by the arrow 102 of FIG. 6.**

Figure 7:
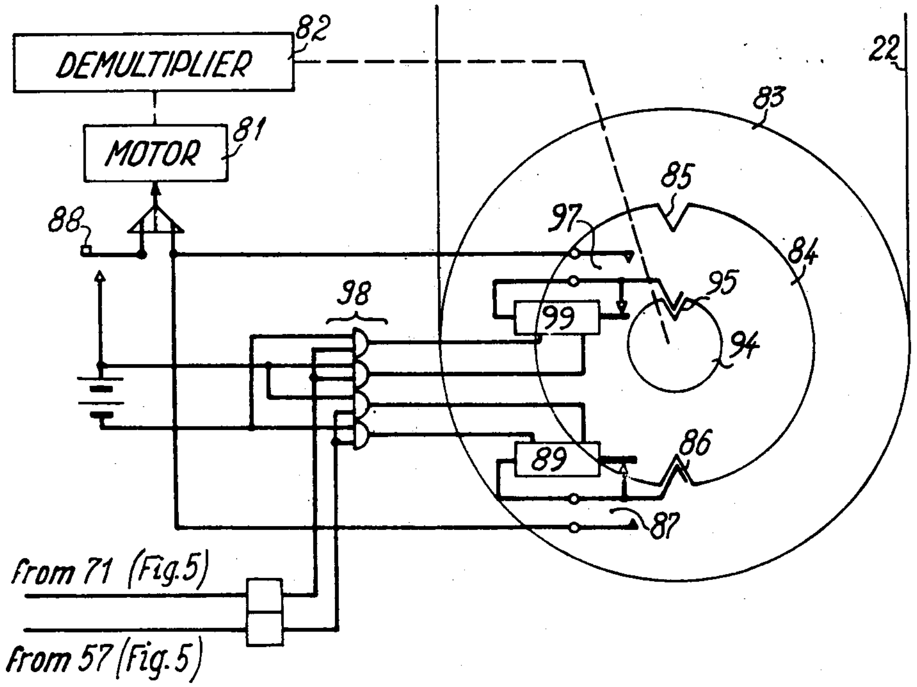
FIG. 7 illustrates the system for controlling the projection movement and the sorting movement.

FIG. 7 shows the control of the projection and sorting displacements and the switch-over between these two displacements by means of the "normal-sorting" key 57 and of the output signal 71 of the comparator 64.

The motor of the apparatus is illustrated at 81. It drives a reduction gear 82 whereof the spindle bears the pulley 83 for driving the cable 22. The spindle of the reduction gear equally carries two cams 84 and 94. The first cam 84 bears two diametrically opposed notches 85 and 86 which actuate a contact 87 limiting the rotation of the motor to half a revolution. The motor is started in one direction by the operation of the contact 88, either manually or mechanically, and the rotation continues for half-a-revolution owing to the contact 87 closed until the instant when the tip of the long blade of the contact drops into the notch 86. By dropping into the notch, the blade actuates an inverter 89 which reverses the battery leads. At the next start, the motor turns through half a revolution in the other direction.

The second cam 94 bears a single notch 95 which controls a contact 97 limiting the rotation of the motor to one revolution. As in the preceding case, the motor is started by operation of the contact 88 and the rotation continues for one revolution owing to the contact 97 which is closed until the instant when the tip of the long contact blade drops into the notch 95. By dropping into the notch, the blade actuates an inverter 99 which reverses the battery leads. At the next start, the motor turns for one revolution in the other direction.

It is normally the inverter 89 which is supplied with current and the transparency passes from its position within the feed holder to the projection position. If the sorting condition is effective and the comparator 64 transmits a signal, this signal has the result od switching the supply from the inverter 89 to the inverter 99 thanks to a set of gates 98.

Figure 8:
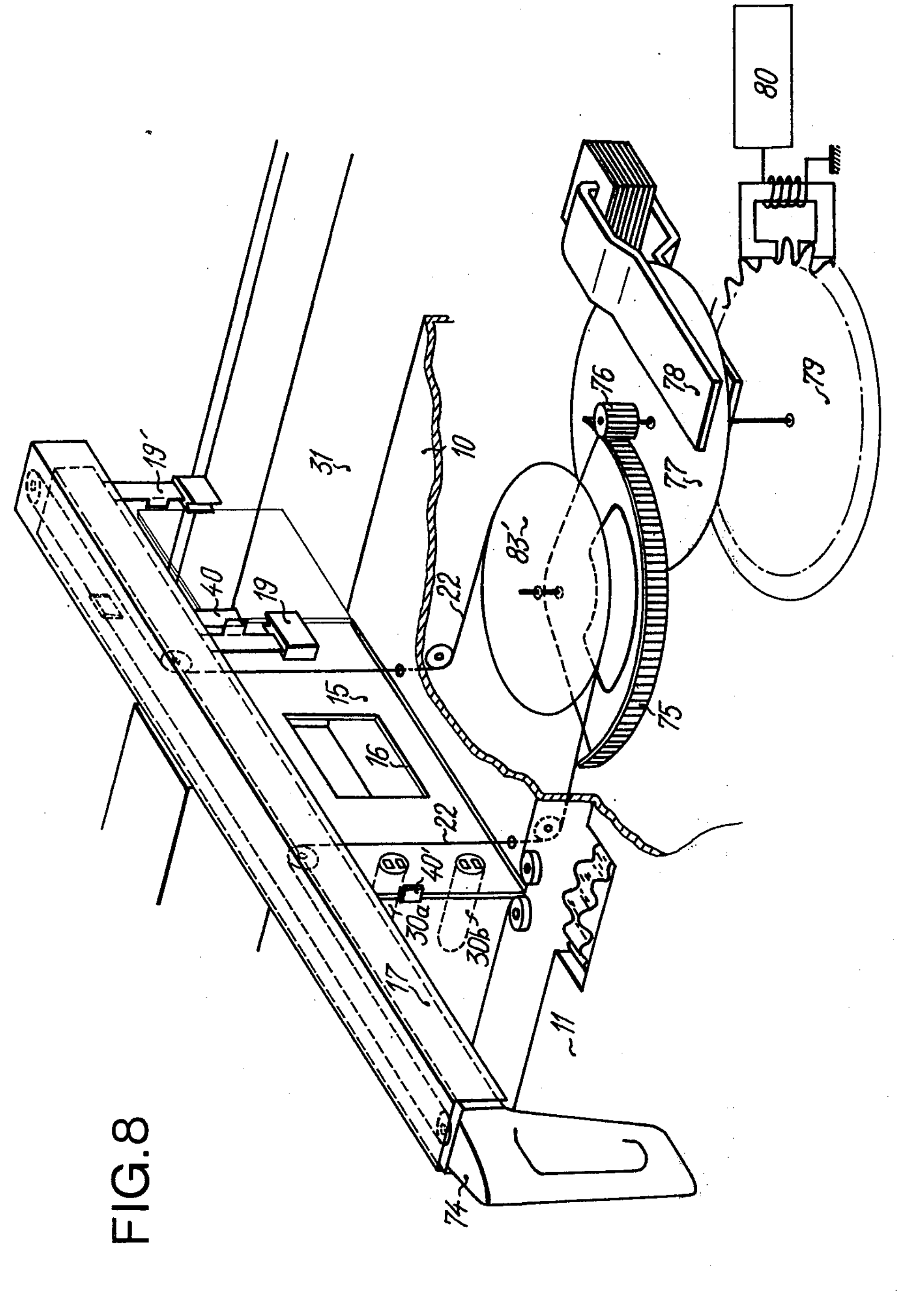
FIG. 8 shows in detail a mechanic part of a manually operated apparatus.

In the foregoing has been described an apparatus for projection, recording, read-back and sorting, wherein the placing in position of the transparencies was automatic and performed by the action of a motor 81. The apparatus may also be non-automatic and the transparencies may be inserted manually by a handle 74 (FIG. 8). In both cases, the pulse clock generator means 80 which controls the registers, converter and comparator of the device has to be synchronized with the movement of the transparency. Further, in the case of manual insertion, the velocity of the insertion movement of the transparency is to be kept constant. In FIG. 8, the cable 22 is driven by a handle 74 instead of motor 81. Cable 22 drives a receptor pulley 83 (FIG. 7) of a receptor pulley 83' (FIG. 8). Pulley 83 or 83' is fixed to a toothed segment 75 which meshes with a pinion 76 driving an eddy current brake comprising a copper disc 77 which passes between the pole pieces of an electromagnet 78. On the same spindle as the pinion 76 and the disc 77 is installed a tone whhel 79 which generates pulses. These pulses are fed to a pulse generator 80 for the purpose of synchronizing it. Pulse generators synchronized to a multiple of the frequency of synchronizing pulses fed to them are known in the prior art and are described, for example, in the chapter "Synchronization and Frequency Division" of the textbook "Pulse and Digital Circuits" by Jacob Millman and Herbert Taub, McGraw Hill Book Co. Inc., 1956, page 383. The output of the generator 80 is fed to the writing-in and reading-out registers, to the buffer registers, to the converter and comparator to control their cadence.

The described apparatus may be employed for recording, reading-back and visually displaying cards or files lacking a transparency image, such as library files. The panels for display or visual indication of alphanumerical characters may be of other known types differing from the type employing liquid crystals, the binary word to matrix character converter then being replaced by an appropriate "digital-image" converter. Display panels operated by digital control have been described, for example, in the article "Computer generated Displays" by R. T. Loewe, R. L. Sisson and P. Horowitz, which appeared in the periodical "Proceedings of the IRE" in January 1961, pages 185–198 (in particular see the list of references of the article).

What I claim is:

1. A device for projecting a transparency carrying a magnetic tape section having magnetically recorded thereon binary digital words representative of alphanumerical characters, said device comprising:

means for imparting to the transparency a constant velocity movement from a feed position to a projection position;

means for writing or reading said binary digital words during said movement and for visualizing the corresponding alphanumerical characters including a magnetic head means co-operating with said magnetic tape section during said movement;

a writing-in register;

a reading-out register;

each of said writing-in register and reading-out register connected to said magnetic head means;

a binary-word to alphanumerical character converter connected to said reading-out register, a visual display panel connected to said converter; and, a pulse-clock generator synchronized with said movement imparting means and controlling said registers and said converter.

2. A device according to claim 1 wherein said character converter is a digital-image converter converting the binary-word signals of the reading-out register into visual matrix character signals.

3. A device according to claim 1 wherein said visual display panel is a crystal display panel.

4. A device according to claim 1 including a sorting means for sorting a transparency according to the binary digital words recorded thereon after the transparency undergoes a constant velocity movement from the feed position to a sorting position and further including means for entering in the writing-in register given sorting digital words and comparator means for comparing said given sorting words to the digital words recorded on the transparency and for selecting the movement from the feed position to the projecting position when the compared words are different and the movement from the feed position to the sorting position when the compared words are identical.

5. A device according to claim 1 wherein said magnetic-tape section of the transparency comprises two tracks, and said magnetic head means comprises a first magnetic head co-operating with one of said tracks for writing or reading binary digital words coded in a first non-return to zero inverted code and a second magnetic head co-operating with the other track for writing or reading binary digital words coded in a second non-return to zero inverted code complementary of the first code.

6. A device according to claim 1 including a tonewheel driven by the means imparting a constant velocity movement to the transparency and means for synchronizing the clock pulse generator by the signal of said tone-wheel.

* * * * *